United States Patent Office 3,052,542
Patented Sept. 4, 1962

3,052,542
INTERMEDIATE MASTER FOR USE IN THE DIAZOTYPE PROCESS AND A PROCESS FOR PRODUCING SAME
John Sulich, Jr., Johnson City, N.Y., assignor to General Aniline & Film Corporation, New York, N.Y., a corporation of Delaware
No Drawing. Filed July 24, 1958, Ser. No. 750,559
8 Claims. (Cl. 96—49)

This invention relates to an intermediate master for use in the diazotype process and to a process for producing such intermediate master. More particularly, this invention relates to a novel process for producing an intermediate master for use in the diazotype process and to said intermediate master.

It is usually necessary to inspect printing plates for errors and imperfections before large printing runs are made. A convenient manner in which this inspection has heretofore been accomplished was by printing on the sensitized side of a suitable diazotype sensitized material with the plate to be inspected using the conventional greasy printing ink. The diazotype material that has been used for this purpose is a sepia paper or foil. After printing, the diazotype material was developed by ammonia gas in a whiteprint machine. The sensitized material in the areas covered by the greasy ink was shielded by the ink from contact with the ammonia gas and was not developed, whereas the areas which were not covered by the ink were developed by the ammonia gas. The ink and undeveloped sensitizer therebeneath were then removed by means of suitable solvents such as, for example, naphtha for the ink and water for the sensitizer. The print thus produced was then used as an intermediate master from which reprints on other light-sensitive diazotype materials, such as, for example, blackline, blue line, red line, etc., were made in a conventional manner upon exposure and development in a whiteprint machine. These reprints were negative copies of the original printing plate.

There are many disadvantages to this prior art process of inspecting printing plates. One of the disadvantages of this process resides in the fact that the conventional greasy ink does not form a sufficiently satisfactory barrier to the ammonia gas with the result that some of the ammonia gas penetrates the layer of ink and causes development of the sensitizer and coupler therebeneath. Attempts have been made to improve the barrier characteristics of the ink but these attempts have not met with success.

It is an object of this invention to provide a novel process for obtaining an intermediate master for use in the diazotype process.

It is a further object of this invention to provide a novel process for obtaining an intermediate master by impressing upon a sensitized diazotype intermediate material, a faster coupling compound than the coupling compound already present in said material and one that produces an azo dyestuff which has a different actinic transparency than the dyestuff formed by the diazo and coupling compound(s) originally present in said material.

It is another object of this invention to provide an intermediate master for use in the diazotype process having dyes of different color and different actinic light transmitting properties therein.

Other objects and advantages of this invention will become apparent to those skilled in the art from the detailed description thereof given below.

The diazotype intermediate material for use in this process comprises a suitable base, such as paper or transparent or translucent plastic sheet material, such as cellulose triacetate, polyethylene terephthalate or the like, coated with a diazo compound derived from a p-phenylenediamine and a coupling compound which reacts with the diazo compound under alkaline conditions to form an azo dye. The coupling compound is one containing an active methylene group or a phenolic hydroxy group and the speeds at which these coupling compounds couple or react with the aforestated diazo compounds vary, certain ones reacting faster than others. Also, the azo dyes formed by the reaction of different coupling components with a selected diazo have different light transmitting properties, especially as regards actinic light.

The novel process of this invention comprises selection of a diazotype intermediate material containing a diazo compound and a coupling compound of a certain degree of coupling activity and impressing on the sensitized face of this material a coupling compound which has a different degree of coupling activity and produces an azo dye from the diazo employed which has materially different light transmititng characteristics relative to actinic light than the dye produced by the diazo compound and the first mentioned coupling compound.

In such procedure, for example, the intermediate material may contain a relatively slow acting coupling compound, whereas the coupling compound impressed on the face of the intermediate material may be a fast acting coupling compound. One of the couplers with the diazo selected should yield a dye which transmits UV light (bluish dye) and the other a dye which absorbs UV light (sepia or yellow dye).

It is known that of the various coupling components available for the formation of azo dyes, those which have an open chain keto methylene group, such as acetoacetanilide, p-sulfo-acetoacetanilide and the like and unsubstituted naphthols such as 2,3-dihydroxynaphthalene, β-naphthol and the like or polyhydric monocyclic phenols such as resorcinol, phloroglucinol, resorcinol-5-sulfonic acid and phloroglucinol-carboxylic acid, are fast acting coupling components with any of the diazos from p-phenylenediamines. Of these couplers, the open chain keto methylene compounds yield yellow or sepia images. The same is true of β-naphthol, resorcinol, phloroglucinol, resorcinol-5-sulfonic acid, and phloroglucinol-carboxylic acid. 2,3-dihydroxynaphthalene, on the other hand, yields a blue dye.

The slow acting couplers include substituted dihydric naphthols, particularly the sulfonic acids thereof such as 1,8-dihydroxynaphthalene-3,6-disulfonic acid, 2,3-dihydroxynaphthalene-6-sulfonic acid and the like, naphthols AS compounds such as β-hydroxyethylamide of 2-hydroxy-3-naphthoic acid, 2-hydroxy-naphthoic acid anilide and the like, polyhydric phenols containing more than one ring such as 2,2'-4,4'-tetrahydroxybiphenyl, 2,4,4'-trihydroxybiphenyl-2'-sulfonic acid, and phenols containing carbamyl groups such as m-hydroxyphenylurea and the like.

The polyhydric naphthalene sulfonic acids yield blue images and the same is true of the naphthol AS compounds. The trihydroxybiphenyls and the n-hydroxyphenylurea on the other hand form sepia-toned images. It is, therefore, a relatively simple procedure for those skilled in the art to select two couplers having different coupling activities and which will yield dyes which have different light transmitting characteristics.

It has been stated that with the involved couplers any of the usual diazos from p-phenylenediamines may be employed such as those obtained from p-phenylenediamine, p-ethylamino-m-toluidine, p-amino-diphenylamine, N-benzyl-N-ethyl-p-phenylenediamine, N - β-hydroxyethyl - N- methyl-p-phenylenediamine, the diazos from the morpholine and piperidine compounds of U.S.P. 2,298,444 and the like.

When it is desired to use my process to inspect printing plates, for example, the fast acting coupling compound is mixed with the greasy printing ink and the commercial diazotype intermediate is printed with the printing plate to be inspected while utilizing such ink. After printing, the diazotype material is developed in the usual manner with moist ammonia gas. The fast acting coupling compound in the ink couples with the diazo compound in the material and forms an azo dye which is transparent to actinic light in the inked portions, whereas the relatively slow acting coupling compound present in the uninked portions of the material couples with the diazo compound in the usual manner forming an azo dye which is opaque to actinic light. The ink is then removed by means of a suitable solvent such as naphtha. An intermediate master is thereby produced having areas transparent to actinic light corresponding to the inked areas and areas opaque to actinic light corresponding to the uninked areas. This master can be used to make reprints on other light sensitized materials in a conventional manner. Negative copies of the original printing plate are thereby produced.

The process of this invention is not limited in its use for the purpose of inspecting printing plates, but may be used in the production of an intermediate master for any purpose. The fast acting coupling compound may be applied to a commercial type of diazotype sheet by any desired means to form the desired image on the sheet. The fast acting coupling compound may be applied to or impressed on the sheet by swabbing, by means of a rubber stamp, by means of a pen or in any other manner with or without ink. The so treated sheet may then be developed in the manner previously described in connection with the use of the process in inspecting printing plates.

The following specific example of my improved process of forming an intermediate master is given below. It is to be understood, however, that this example is given by way of illustration only and not by way of limitation.

*Example*

A solution containing the following ingredients was prepared:

| | |
|---|---|
| 2,3-dihydroxynaphthalene | grams 12 |
| Acetone | cc 5 |
| Methanol | cc 10 |
| Methyl Cellosolve solvent | cc 5 |
| Methyl Cellosolve acetate solvent | cc 5 |
| Ethylene glycol | cc 5 |
| Cellulose acetate | grams 1 |
| Acetamide | do 5 |
| Water | cc 3 |

This solution was then applied by writing with a pen and also by means of a rubber stamp to the sensitized face of a cellulose acetate film which had previously been impregnated with the following solution and dried:

| | |
|---|---|
| Isopropanol | cc 20 |
| Butanol | cc 5 |
| Critric acid | grams 5 |
| Acetic acid | cc 5 |
| Thiourea | grams 5 |
| m-Hydroxyphenylurea | do 5 |
| p-N,N-diethylamino benzenediazonium chloride-zinc chloride double salt | do 15 |
| Water | cc 150 |

The film thus impressed was allowed to dry and after drying, it was developed with ammonia gas in a whiteprint machine. The 2,3-dihydroxynaphthalene is a much faster coupling component than is the m-hydroxyphenylurea. As a result, upon development a pleasing blue dyestuff was formed in the written and stamped areas. In the other areas, a sepia dyestuff was formed by the coupling of the m-hydroxyphenylurea with the diazo compound. The blue dyestuff was essentially transparent to the actinic ultra violet light used in making prints while the brownish-yellow dye was essentially opaque to the actinic light.

The developed film was used as a master in the making of diazotype prints. When prints were made by the use of this master, the areas in the copy under the blue dye became white, whereas the areas of the copy under the sepia dye became dark. Thus a negative of the original material was obtained.

The basic principle of this invention is that the coupling compound used in the preformed diazotype material reacts with the diazo compound to produce a dye which has materially different actinic light transmitting properties than the dye formed by the reaction of the diazo compound with the impressed coupling compound. While in the above example I have described a process wherein the two coupling compounds are so chosen that the dye formed by the impressed coupling compound is more transparent to actinic light than is the dye formed by the coupling compound originally present in the diazotype material, the process of this invention can be practiced if the light transmitting properties of the dyes produced by the use of the two coupling compounds is the reverse of those given in the example. Thus a diazotype material may be formed by sensitizing a film base with a suitable relatively slow acting coupling compound, such as 1,8-dihydroxynaphthalene - 3,6 - disulfonic acid, for example, which will produce a blue dyestuff which is essentially transparent to ultra violet light when developed and impressing on the sensitized face a faster acting coupling compound, such as resorcinol, for example, which will produce a sepia dye which is essentially opaque to ultra violet light.

The vehicle or medium with which the fast acting coupling compound is applied depends to some extent on the purpose for which the novel process of this invention is utilized. Thus, as already indicated elsewhere in this specification, when the process is utilized for inspecting printing plates, the fast acting coupling compound may be mixed with the greasy ink used for printing. Other suitable vehicles are water and polar or non-polar solvents. The polar or non-polar solvents may be used in combination with the ink as a vehicle.

The vehicle used may also be rendered alkaline by adding a suitable compatible alkaline material, preferably one that is not volatile at the temperatures used in the process, to the vehicle. When the fast acting coupling compound is dissolved or dispersed in the alkaline vehicle and impressed on the diazotype material, coupling in the impressed areas may take place immediately without development or coupling taking place in the remaining non-impressed areas. The vehicle may also be used while neutral or it may even be acidified. In the latter two cases, development takes place over the entire surface of the sensitized material in the developing machine.

Many modifications of my invention will occur to a person skilled in the art from the detailed description given above. My invention is, therefore, not limited to the detailed description but includes all modifications that fall within the scope of the appended claims.

I claim:

1. A process of producing an intermediate master for use in the diazotype process which comprises overcoating in spaced portions only of a previously prepared sensitized face of an unexposed diazotype material containing a single diazo compound of the p-phenylene diamine type and a coupling compound having a relatively slow degree of coupling activity and selected from the class consisting of sulfonated dihydric naphthols, naphthol A-S compounds, polyhydric phenols containing more than one ring and phenols containing a carbamate group, a coupling compound which has a faster degree of coupling activity than said first-named coupling compound and selected from the class consisting of open chain keto methylene compounds, unsubstituted naphthols and polyhydric monocyclic phenols and which upon coupling with said diazo compound produces a dye which has materially different actinic light transmitting properties than the dye produced by the coupling of the diazo compound and said first-named coupling compound and developing the diazotype material with most ammonia gas to couple both coupling compounds with the diazo compound prior to exposure of the material to actinic light whereby an intermediate master is produced having dyes of different actinic light transmitting properties in different portions thereof.

2. A process as recited in claim 1 wherein the diazo compound is p-N,N-diethylamino benzenediazonium chloride-zinc chloride double salt.

3. A process as recited in claim 1 wherein the relatively slow acting coupling compound is m-hydroxyphenylurea and the faster acting coupling compound is 2,3-dihydroxynaphthalene.

4. A process as recited in claim 2 wherein the fast acting coupling compound is 2,3-dihydroxynaphthalene and the slow acting coupling compound is m-hydroxyphenylurea.

5. An unexposed diazotype material suitable for the production of an intermediate master for use in the diazotype process which comprises a light permeable base, said base having a light-sensitive face comprising a coating of a diazo material and a coupling compound of a relatively slow degree of coupling activity and which coupling compound is capable upon development of producing a dye having certain light transmitting properties and selected from the class consisting of sulfonated dihydric, naphthols, naphthol A-S compounds, polyhydric phenols containing more than one ring and phenols containing a carbamate group, said face also having on spaced portions only thereof an overcoating of a different coupling compound having a degree of activity faster than said first-named coupling compound and which different coupling compound is capable upon development with moist ammonia gas of producing a dye having light transmitting properties different from those of the first-named coupling compound said last named coupling compound being selected from the class consisting of open chain keto methylene compounds, unsubstituted naphthols and polyhydric monocyclic phenols.

6. An unexposed diazotype material as recited in claim 5 wherein one of said coupling compounds is capable of producing a dye which has a blue color which is essentially transparent to actinic light and the other coupling compound is capable of producing a dye which is brownish-yellow and is essentially opaque to actinic light.

7. An unexposed diazotype material as recited in claim 6 wherein said coupling compound capable of producing said blue colored dye is 2,3-dihydroxynaphthalene and said coupling compound capable of producing said brownish-yellow dye is m-hydroxyphenylurea.

8. An unexposed diazotype material as recited in claim 5 wherein one of said coupling compounds is a naphthol coupling compound which is capable of producing a blue dye which is essentially transparent to actinic light and the other coupling compound is resorcinol which produces an essentially opaque brownish dye.

References Cited in the file of this patent

UNITED STATES PATENTS

| 2,542,716 | Slifkin | Feb. 20, 1951 |
| 2,659,672 | Leuch | Nov. 17, 1953 |
| 2,773,768 | Sanders et al. | Dec. 11, 1956 |
| 2,807,545 | Frederick | Sept. 24, 1957 |
| 2,953,471 | Landau | Sept. 20, 1960 |
| 2,970,909 | Slimowicz | Feb. 7, 1961 |

FOREIGN PATENTS

| 807,891 | Germany | July 9, 1951 |
| 694,580 | Great Britain | Nov. 17, 1953 |